(12) United States Patent  
Fornarelli (10) Patent No.: US 11,038,360 B2  
(45) Date of Patent: Jun. 15, 2021

(54) VAPORIZATION DEVICE, METHOD OF USING THE DEVICE, A CHARGING CASE, A KIT, AND A VIBRATION ASSEMBLY

(71) Applicant: GSW CREATIVE CORPORATION, Sacramento, CA (US)

(72) Inventor: Thomas Fornarelli, Chicago, IL (US)

(73) Assignee: GSW Creative Corporation, Santa Monica, CA (US)

( * ) Notice: Subject to any disclaimer, the term of this patent is extended or adjusted under 35 U.S.C. 154(b) by 103 days.

(21) Appl. No.: 15/158,572

(22) Filed: May 18, 2016

(65) Prior Publication Data

US 2017/0332701 A1    Nov. 23, 2017

(51) Int. Cl.
| | |
|---|---|
| *A24F 13/00* | (2006.01) |
| *A24F 17/00* | (2006.01) |
| *A24F 25/00* | (2006.01) |
| *H02J 7/00* | (2006.01) |
| *A24F 40/60* | (2020.01) |
| *A24F 40/95* | (2020.01) |
| *H05B 3/14* | (2006.01) |
| *A24F 40/10* | (2020.01) |

(52) U.S. Cl.
CPC ............ *H02J 7/0045* (2013.01); *A24F 40/60* (2020.01); *A24F 40/95* (2020.01); *H05B 3/141* (2013.01); *A24F 40/10* (2020.01); *H02J 7/0047* (2013.01); *H02J 7/0048* (2020.01); *H02J 7/0049* (2020.01)

(58) Field of Classification Search
CPC ..... A24F 47/002; A24F 47/008; A61M 11/00; A61M 15/00

USPC ........................................................ 131/329
See application file for complete search history.

(56) References Cited

U.S. PATENT DOCUMENTS

| | | | |
|---|---|---|---|
| 6,142,146 | A | 11/2000 | Abrams et al. |
| 7,845,359 | B2 | 12/2010 | Montaser |
| 8,869,793 | B1 | 10/2014 | Spandorfer |
| 8,908,943 | B2 | 12/2014 | Berry et al. |
| 8,910,640 | B2 | 12/2014 | Sears et al. |
| 9,308,336 | B2 | 4/2016 | Newton |
| 9,603,390 | B2 | 3/2017 | Li et al. |
| 10,512,282 | B2 * | 12/2019 | Bowen ................. A61M 11/042 |

(Continued)

FOREIGN PATENT DOCUMENTS

| | | |
|---|---|---|
| DE | 102009015582 A1 | 10/2010 |
| WO | WO 01/93932 A1 | 12/2001 |

(Continued)

OTHER PUBLICATIONS

Lindsay Fox, Blu Cigs Social Feature—Useful or a Huge Waste of Time?, published Aug. 12, 2013, e-cigarette reviewed, http://ecigarettereviewed.com/blucigs-socialfeatureusefulorahugewasteoftime/.

(Continued)

*Primary Examiner* — Abdullah A Riyami  
*Assistant Examiner* — Thang H Nguyen (57) ABSTRACT

A vaporization device assembly includes a battery, a first dampening spacer, a second dampening spacer, a printed circuit board, a vibrator, a microprocessor, a coil holder, a vaporization chamber, multiple wicks, a tank with a reservoir, a reservoir plug, and a pressure sensor in pneumatic communication with the reservoir of the tank. During operation, the vaporization device assembly notifies a user of timing related to inhalation of a vaporizable sub stance.

16 Claims, 8 Drawing Sheets

(56) References Cited

U.S. PATENT DOCUMENTS

| | | | | |
|---|---|---|---|---|
| 2002/0000225 | A1* | 1/2002 | Schuler | A61M 15/00 128/200.14 |
| 2005/0016550 | A1* | 1/2005 | Katase | A61M 11/005 131/194 |
| 2005/0247312 | A1 | 11/2005 | Davies | |
| 2008/0163869 | A1 | 7/2008 | Nobutani et al. | |
| 2008/0276947 | A1 | 11/2008 | Martzel | |
| 2009/0107492 | A1 | 4/2009 | Ooida | |
| 2010/0132699 | A1* | 6/2010 | Burolla | A61M 15/00 128/200.23 |
| 2010/0307518 | A1* | 12/2010 | Wang | A24F 40/485 131/329 |
| 2010/0313901 | A1* | 12/2010 | Fernando | H02J 7/0042 131/330 |
| 2011/0146670 | A1* | 6/2011 | Gallem | A61M 16/0833 128/200.14 |
| 2012/0118301 | A1 | 5/2012 | Montaser | |
| 2013/0298905 | A1 | 11/2013 | Levin et al. | |
| 2013/0312742 | A1 | 11/2013 | Monsees et al. | |
| 2014/0007892 | A1* | 1/2014 | Liu | A24F 40/95 131/329 |
| 2014/0014125 | A1* | 1/2014 | Fernando | H02J 7/0068 131/328 |
| 2014/0238423 | A1 | 8/2014 | Tucker et al. | |
| 2014/0238424 | A1 | 8/2014 | Macko et al. | |
| 2015/0020825 | A1* | 1/2015 | Galloway | A24F 40/42 131/329 |
| 2015/0224268 | A1* | 8/2015 | Henry | G06Q 30/00 128/202.21 |
| 2015/0245664 | A1 | 9/2015 | Memari et al. | |
| 2015/0245665 | A1 | 9/2015 | Memari et al. | |
| 2015/0257445 | A1* | 9/2015 | Henry, Jr. | A24F 40/53 131/328 |
| 2015/0257447 | A1 | 9/2015 | Sullivan | |
| 2015/0258289 | A1* | 9/2015 | Henry, Jr. | A61M 11/042 128/202.21 |
| 2015/0272215 | A1 | 10/2015 | Esses | |
| 2015/0272217 | A1 | 10/2015 | Chen | |
| 2015/0282527 | A1* | 10/2015 | Henry, Jr. | A24F 40/51 131/328 |
| 2015/0333542 | A1* | 11/2015 | Alarcon | A24F 40/95 131/328 |
| 2015/0335073 | A1 | 11/2015 | Minskoff et al. | |
| 2015/0335075 | A1 | 11/2015 | Minskoff et al. | |
| 2015/0342256 | A1 | 12/2015 | Chen | |
| 2016/0007651 | A1* | 1/2016 | Ampolini | A24F 40/53 131/328 |
| 2016/0029693 | A1 | 2/2016 | Klein et al. | |
| 2016/0050974 | A1* | 2/2016 | Galloway | G06F 11/27 73/865.8 |
| 2016/0050975 | A1* | 2/2016 | Worm | A24F 40/95 131/328 |
| 2016/0128389 | A1* | 5/2016 | Lamb | A24F 40/51 131/328 |
| 2016/0157524 | A1* | 6/2016 | Bowen | H05B 1/0244 128/200.14 |
| 2016/0158782 | A1 | 6/2016 | Henry, Jr. et al. | |
| 2016/0183598 | A1 | 6/2016 | Tucker et al. | |
| 2016/0183599 | A1 | 6/2016 | Tucker et al. | |
| 2016/0356751 | A1 | 12/2016 | Blackley | |
| 2017/0105452 | A1* | 4/2017 | Mironov | H05B 1/0244 |
| 2017/0119052 | A1* | 5/2017 | Williams | A24F 40/53 |
| 2017/0135410 | A1 | 5/2017 | Cameron | |
| 2017/0251723 | A1* | 9/2017 | Kobal | A24F 40/30 |
| 2017/0354181 | A1 | 12/2017 | Fornarelli | |
| 2018/0064169 | A1 | 3/2018 | Biel et al. | |
| 2019/0021400 | A1 | 1/2019 | Fornarelli | |
| 2019/0046745 | A1* | 2/2019 | Nettenstrom | A61M 15/0021 |

FOREIGN PATENT DOCUMENTS

| | | |
|---|---|---|
| WO | WO 2014/120479 A1 | 8/2014 |
| WO | WO 2014/207719 A1 | 12/2014 |
| WO | WO 2015/177044 A1 | 11/2015 |
| WO | 2016009202 A1 | 1/2016 |
| WO | WO 2016/090303 A1 | 6/2016 |

OTHER PUBLICATIONS

The Latest Supersmoker, Bluetooth, http://www.supersmokerbluetooth.com/#bottom.

PCT International Search Report for International application No. PCT/US2017/033219, dated Sep. 18, 2017.

International Preliminary Report on Patentability for International application No. PCT/US20171033219, dated Nov. 29, 2018.

International Preliminary Report on Patentability for International application No. PCT/US2017/033219, dated Nov. 29, 2018.

PCT International Search Report for International application No. PCT/US2017/037111, dated Sep. 8, 2017.

Supplementary European Search Report issued for EP17800132 and dated Oct. 10, 2019.

\* cited by examiner

VAPORIZATION DEVICE, METHOD OF USING THE DEVICE, A CHARGING CASE, A KIT, AND A VIBRATION ASSEMBLY

TECHNICAL FIELD

The present invention relates to vaporization devices. More specifically, the present invention relates to a vaporization device, a method of using the device, a charging case, a kit, and a vibration assembly.

BACKGROUND

Personal vaporization devices which store substances to be vaporized include, for instance, inhalers for asthma treatment. These personal vaporization devices have various different components which provide feedback to a user. Some of the features include a means of indicating by visual cue, audible cue, touch feedback, haptic, vibration, heat or other sensory signal, or prompt, that a device has reached a desired or predetermined vaporization temperature or for a predetermined time. This provides a user with information as to when a device is ready for use. For example, a simple LED may glow when the personal vaporization device is ready for inhalation, or provide different patterns, colors, or strengths programmed to give feedback related to consumption of the vaporized substance. Some of these features have also been adapted to the newer electronic cigarettes.

Personal vaporization devices being used for medical purposes can be equipped with additional feedback features which can give auditory and/or tactile warnings such as vibration, while the vibration can also be to disperse the active agents. Other gimmicks related to aerosol devices have also been created, such as providing a mechanism whereby a pack of e-cigarettes vibrates when within a certain preprogrammed distance from another pack of the same e-cigarettes, thus alerting the user as to a potential new supply.

There remains, however, a need for connecting the personal vaporization device, and specifically an electronic cigarette, to the safe and precise medical delivery of medicinal cannabis, for instance, via a simple haptic feedback.

SUMMARY

The present invention relates to vaporization device which has a battery, a first spacer at the mouthpiece end and a second spacer at the vibration end; a printed circuit board, a vibrator and a microprocessor housed in the second spacer; a coil holder configured to accommodate a ceramic coil, a vaporization chamber, and a plurality of wick portions; a coil for vaporizing substances; a tank having an reservoir, a first and a second end, wherein the reservoir is configured for housing vaporization substances; a reservoir plug which is accommodated in a first end of the tank; and a pressure sensor in pneumatic communication with the reservoir of the tank, wherein the battery at the vibration end is adjacent to and in electronic communication with the printed circuit board, the vibrator and the microprocessor which are contained in the second spacer, wherein the battery at the mouthpiece end is in electronic communication with the ceramic coil, and wherein the battery at the mouthpiece end is contiguous with the first spacer which separates the battery from the tank and the mouthpiece.

A charging case for a vaporization device comprising a lid, a cradle and a base, wherein the cradle is configured to secure a vaporization device in a position conducive for charging.

A kit comprising a vaporization device, a charging case comprising a lid, a cradle and a base for charging the electronic cigarette; and a plurality of tanks filled with vaporizable sub stance.

A vibration control assembly for a vaporization device comprising a spacer housing a printed circuit board, a vibrator, and a microprocessor for use in controlling the time at which the vibrator vibrates, the duration of the vibration, the strength of the vibration, and the pattern of the vibration, wherein the spacer is formed of a dampening material from the group consisting of plastic, rubber, silicon, and mixes thereof.

The present invention also relates to a method for controlling vibration within a vaporization device. The method includes receiving, at a microprocessor, a signal from a pressure sensor in pneumatic communication with pneumatic communication with a reservoir of the vaporization device; determining, at the microprocessor, at least one of an initiation of inhalation and an end of a draw of the vaporization device based on the signal from the pressure sensor; and activating a vibrator based on the at least one of the initiation of inhalation and the end of a draw of the vaporization device.

Other advantages and features of the disclosure will become apparent upon review of the detailed description and accompanying drawings.

DETAILED DESCRIPTION

The following detailed embodiments presented herein are for illustrative purposes. That is, these detailed embodiments are intended to be exemplary of the present invention for the purposes of providing and aiding a person skilled in the pertinent art to readily understand how to make and use of the present invention.

Accordingly, the detailed discussion herein of one or more embodiments is not intended, nor is to be construed, to limit the metes and bounds of the patent protection afforded the present invention, in which the scope of patent protection is intended to be defined by the claims and equivalents thereof. Therefore, embodiments not specifically addressed herein, such as adaptations, variations, modifications, and equivalent arrangements, should be and are considered to be implicitly disclosed by the illustrative embodiments and claims described herein and therefore fall within the scope of the present invention.

Additionally, it is important to note that each term used herein refers to that which a person skilled in the relevant art would understand such term to mean based on the contextual use of such term herein. To the extent that the meaning of a term used herein, as understood by the person skilled in the relevant art based on the contextual use of such term, differs in any way from any particular dictionary definition of such term, it is intended that the meaning of the term as understood by the person skilled in the relevant art should prevail.

Figure 1:
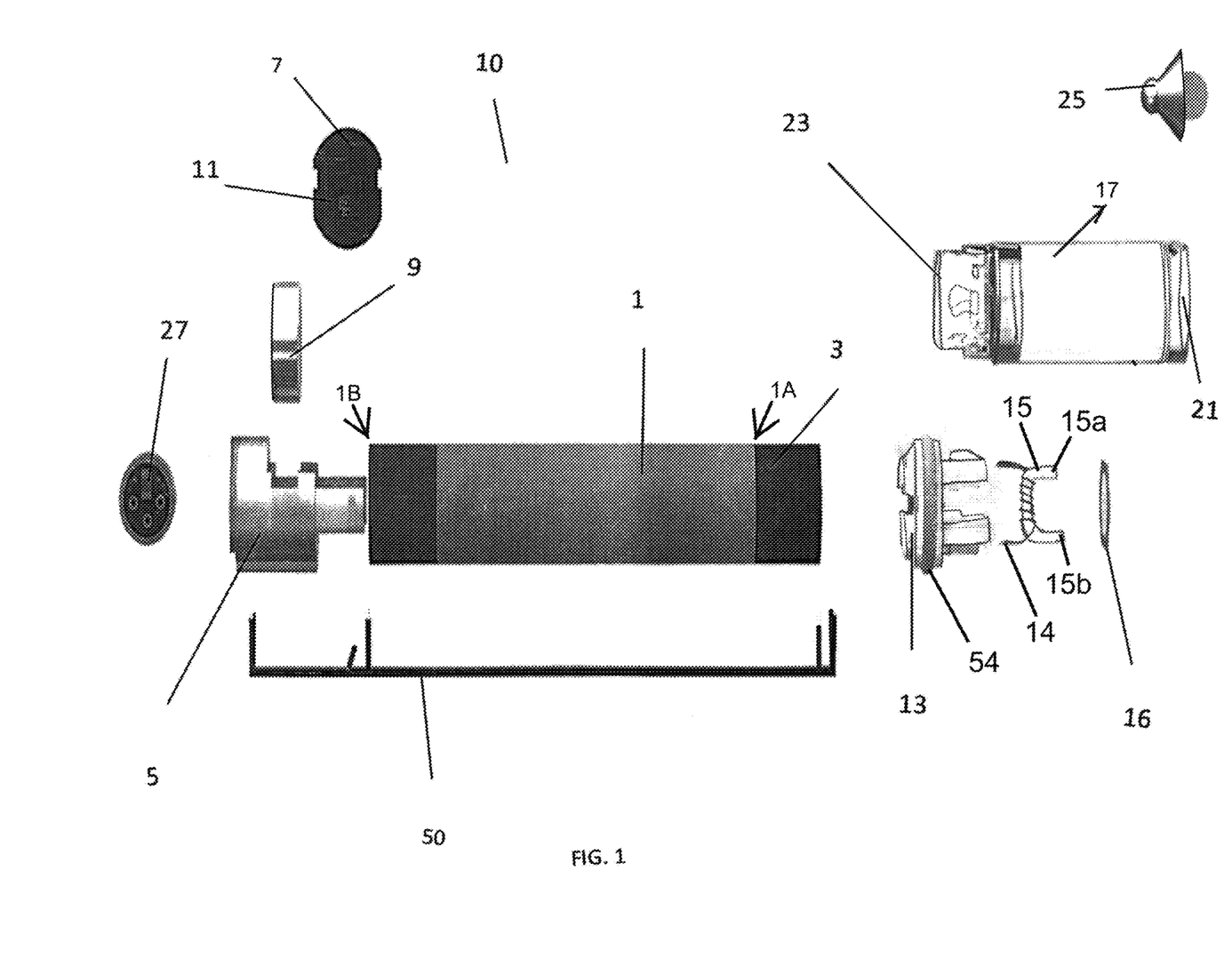
FIG. 1 illustrates an exploded view of an embodiment of the vaporization device in accordance with the principles of the present invention.

FIG. 1 illustrates an embodiment of the vaporization device assembly 10 of the present invention in an exploded and unassembled view. In the embodiment is provided the battery 1 which supplies electricity by which the microprocessor 11 and the printed circuit board 7 ("PCB") activate the method of vaporization and controlling the same of the assembly. The PCB may include, for example, but is not limited to, a processing unit, a memory unit, a plurality of timers, and other suitable electrical components. Electronic components of the assembly 10 are fixed to the PCB 7, which mechanically supports and electrically connects components of the assembly using tracks, pads, and other features etched from conductive sheets laminated onto a non-conductive substrate. In some embodiments, the electronics of the PCB 7 are composed of a synthetic material that is thin and flexible. A thin and flexible PCB 7 allows the same to conform to the shape of the electronic cigarette. A PCB 7 is composed of materials such as, but not limited to, polyimide, polyethylene naphthalate, poletherimide, fluoropolymers, transparent conductive polyester, and other suitable materials for flexible electronics.

The battery 1 of the vaporization device assembly 10 can be rechargeable, can be recharged/charged via induction charging, and/or can be charged by a wall electrical outlet, and/or by accommodating a USB to a computer to recharge/charge. In some embodiments, battery 1 is a lithium battery, a lithium-ion battery, a nickel-cadmium ("NiCd") battery, a nickel-metal hydride ("NiMH") battery, or another suitable battery type. The battery 1 of the vaporization device assembly 10 will be of suitable shape and length to essentially provide the look and feel of an electronic cigarette.

Figure 2:
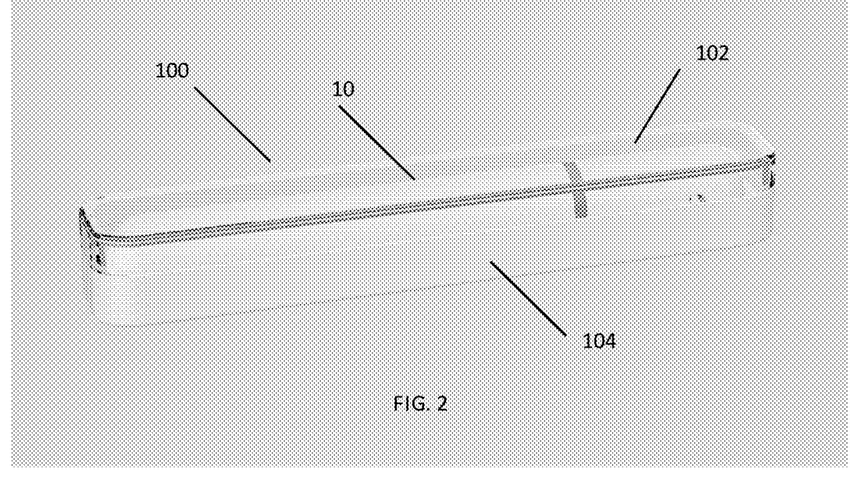
FIG. 2 illustrates an embodiment of the charging case in accordance with the principles of the present invention.
Figure 3:
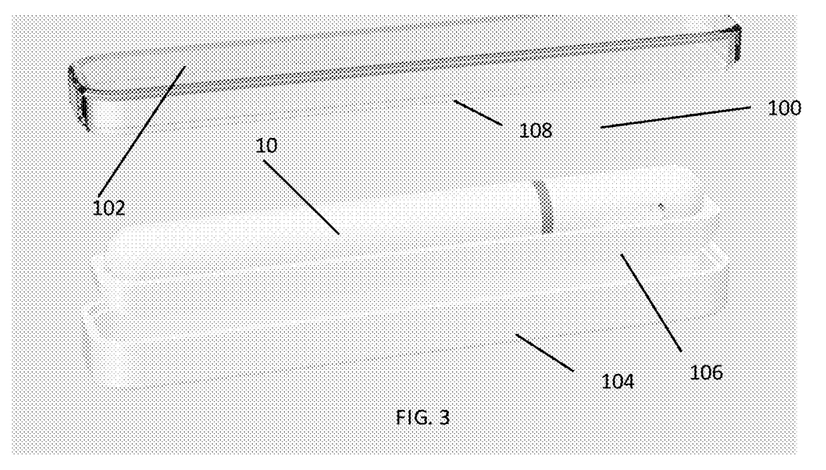
FIG. 3 illustrates an embodiment of the charging case in accordance with the principles of the present invention.

FIG. 2 illustrates an embodiment of the vaporization device assembly 10 of the present invention in an embodiment of a charging case 100 of the present invention. The charging case 100 has a lid 102 and a base 104 which is configured to snuggly accommodate the vaporization device assembly 10. In an embodiment, the lid 102 is transparent, and the vaporization device assembly 10 is visible through the lid 102. It is not necessary that the lid 102 be transparent. In another embodiment, the lid 102 is not transparent, is any color, and/or is translucent or opaque, in whole or in part. FIG. 3 illustrates a semi-exploded view of the charging case 100 of FIG. 2, wherein the lid 102 is partially hidden at the top right corner. In this view it is shown that there is a cradle in which the vaporization device assembly 10 is cradled to provide a good fit in the charging case 100. The lid 102 has a lid edge 108 which is compatible with the base edge 110 so as to engage and retain each other to close and hold the charging case 100 in the closed position.

Figure 4:
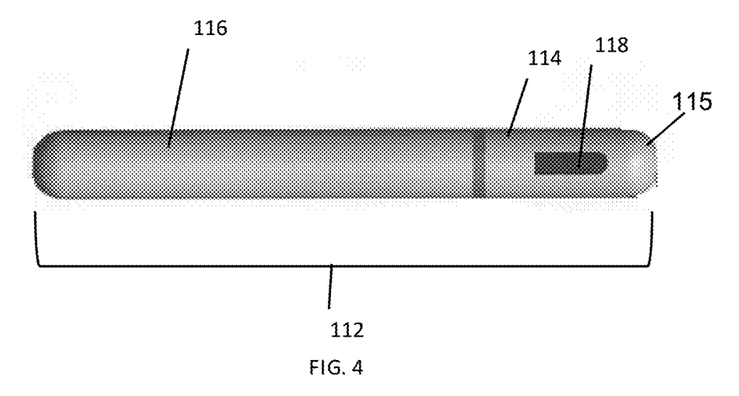
FIG. 4 illustrates an embodiment of the vaporization device in accordance with the principles of the present invention.
Figure 4A:
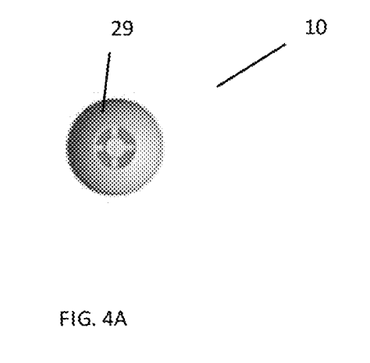
FIG. 4A illustrates a top plan view of the vaporization device in accordance with the principles of the present invention.

In FIGS. 2 and 3, and in FIG. 4 is illustrated the vaporization device assembly 10 encased in a cover 112. The cover 112 is in two parts and is provided with a shorter mouthpiece end cover 114 and a longer vibration end cover 116. The mouthpiece end cover 114 is configured to accommodate the tank 17 while the vibration end cover 116 is configured to accommodate the battery 1, first and second spacers 3,5, the vibrator 9, one or more pressure sensors 27, the PCB 7 and the microprocessor 11. The cover 112 is preferably made from medical grade plastic. The mouthpiece end cover 114 in this embodiment is also provided with a mouthpiece 115 and a window 118 for the convenience of the user to be able to identify whether there is a tank 17 in the vaporization device assembly 10 at all, and if so, the level of vaporization substance therein. FIG. 4A illustrates a top plan view of the vaporization device assembly 10. The top and bottom ends of the vaporization device assembly 10 are mirror images. Therefore, the tip 29, can be of any shape, and in this embodiment is rounded at both ends and can also be provided with a vortex movement such as that of a windmill, as long as an air passage is provided for drawing air through the device to the mouthpiece end. Moreover, in this embodiment, in the center of the tip 29 is a screened air passage for the vaporization process. This screen can prevent particulate matter from entering the device and potentially damaging or interfering with the functioning thereof Turning back to FIG. 3, the cradle 106 further serves to stabilize the vaporization device assembly 10 in the charging case 100 in the event that the battery is rechargeable. In such an embodiment the placement of the vaporization device assembly 10 inside the charging case 100 allows a charged charging case 100 to charge a vaporization device assembly 10. In an embodiment wherein the charging case 100 is rechargeable, the charging case 100 can be recharged/charged via induction charging, and/or can be charged by a wall electrical outlet, and/or by accommodating a USB to a computer to recharge/charge. Preferably, the base 104 of the case is provided with a USB outlet and/or a cord outlet for direct charging from the wall. The charging case 100 can also be provided with LED lights such that a pattern for charging is detected on the charging case 100. For example, but not limited to, a pattern whereby lights flash in a pattern when the vaporization device assembly 10 is being charged, and a different pattern when finished and only the charging case 100 is being charged.

Figure 5:
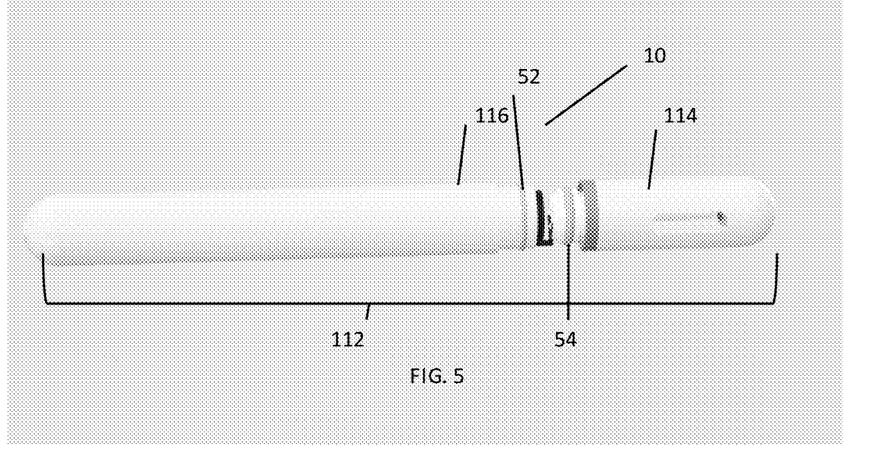
FIG. 5 illustrates a partly assembled view of the vaporization device in accordance with the principles of the present invention, in accordance with the principles of the present invention.

FIG. 5 illustrates the cover 112 being assembled over the vaporization device assembly 10. The two parts (mouthpiece end cover 114, and vibration end cover 116) of the cover 112 can be joined by any means understood by a person in the art to securely and smoothly fit the two pieces together. In the embodiment in FIG. 5 is shown an O-ring 52 for a lip and groove snap fit for retaining the two parts (mouthpiece end cover 114, and vibration end cover 116) in a closed position. Also shown is an O-ring 54 on the internally located coil holder 13 for stably affixing the coil 14 in the cover 112.

FIG. 1 further illustrates, at a first end 1A (or "mouthpiece end") of the battery 1, a first spacer 3. This first spacer 3 is made of dampening material, such as, for instance, a foam rubber material. When the vaporization device assembly 10 is assembled, the first spacer 3 is located adjacent to coil holder 13 containing a wick 15 with a plurality of wick portions 15a, 15b (wick portion 15a being at a first end of the wick 15 and wick portion 15b being at a second end of the wick 15), the wick 15 located at a second end 23 of the tank 17 (the second end 23 being opposite a first end 21 of the tank 17). The coil holder 13 is kept in place in the tank 17 by the use of an O-ring 54, see for example FIG. 5 and FIG. 1. This prevents the movement of the wick 15 and coil holder 13 in the vaporization device assembly 10 and cover 112, thus reducing a chance of damaging the electrical components or leaking any of the vaporization substance from the tank 17. A cap 16 is also provided in the tank to further protect the wick 15. The wick 15 can be any material understood to be effective for vaporizing substances, for instance, but not limited to, ceramic.

In general e-liquid tanks are filled with an oil based substance which is vaporized and provides either flavors and medicinals. The tanks are provided with a small delivery aperture, which makes it difficult to accurately fill the tank for filling prescriptions and medicaments, but also makes a mess which could in turn ruin the electronics if exposed to the oils. Imprecise filling of the tanks results in loss of vaporizable substance, potentially the electronics of the device, and therefore, can be costly. Moreover, medical prescriptions require consistent and precise dosages, and at the same time require medical grace preparation, vaporization substance and materials, which is not possible with leaky and imperfect filling. This problem is solved by, at the first end 21 of the tank 17, providing a reservoir plug 25.

Figure 6:
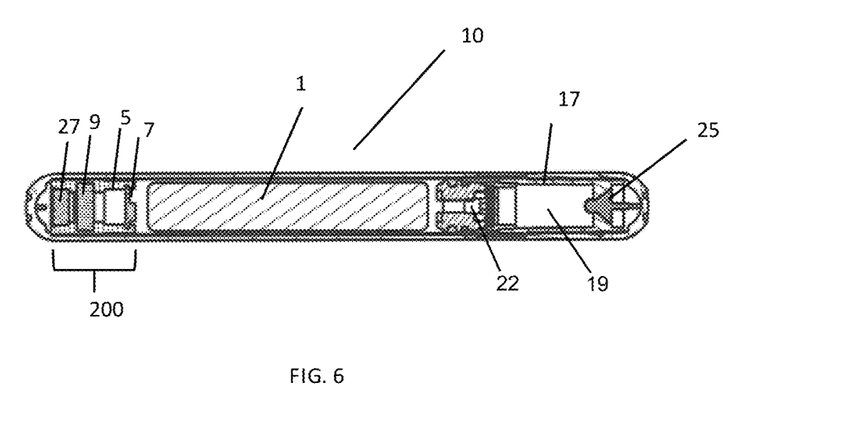
FIG. 6 illustrates a cross section of the vaporization device in accordance with the principles of the present invention.

In FIG. 6 can be seen the reservoir plug 25 inserted into the first end of the tank such that the locking ball shape catches the top of the tank preventing dislodgement. Moreover, the cone shape of the reservoir plug 25 provides a funnel design that offers a broader surface by which to guide a filling needle. This shape of the reservoir plug 25 allows for more accurate filling with much less vaporizable substance lost outside the reservoir 19 of the tank 17, thus sparing the electronic components of the vaporization device assembly 10 while saving money. Moreover, the shape of the reservoir plug 25 prevents the leaking of the vaporizable substance when already filled into the interior space of the reservoir 19 because the ball end secures the same.

A second end 1B (or "vibration end") of the battery 1 in FIG. 6 abuts the second spacer 5. The second spacer 5 is configured to specifically accommodate the shape of a pressure sensor 27, the PCB 7 and microprocessor 11, and the vibrator 9. The second spacer 5 and components housed thereby are referred to as a vibration assembly 200. The second spacer 5 is made of a plastic or dampening material. For example, in one embodiment it is made of silicone. The material of the second spacer 5 which surrounds the vibrator 9 and in which it sits, dampens the vibration. In addition, the distance from the mouthpiece of the user provides a mechanism for dampening the vibration of the vibrator 9, and also the first spacer 3, contiguous with the first end 1A of the battery 1, dampens the strength of the vibration on the mouth of the user. Even the cover 112 of the vaporization device assembly 10 has a dampening effect. This is important because although the vibrator 9 is pre-programmed to have a low voltage of for example, but not limited to, 0.01 volts, lips are sensitive and a user could still receive a surprise given a vibration stronger than expected at the mouth. By providing a location, surrounding materials, and a configuration conducive to dampening the effect of the vibration so that it is felt last at the lips, the vaporization device assembly 10 provides a new and more comfortable way of giving feedback to the user.

The vibrator 9 feature of the vaporization device assembly 10 could be activated upon a user initially inhaling whereby the vibrator 9 is tied to a pressure sensor 27 detecting inhalation and therefore vibrating at the beginning of the draw. By "draw" it is meant to inhale through the assembly at the mouthpiece end. The pressure sensor 27 may be, for example, but not limited to, a pressure responsive transducer, such as a piezoresistive transducer, having an electrical resistance that varies depending upon the air pressure to which it is subjected from the reservoir 19. Other forms of electronic transducers capable of producing an analog signal in response to air pressure can be utilized for the pressure sensor 27. The pressure sensor 27 is pneumatically connected to the reservoir 19 by at least one airway/duct. FIG. 1 provides for at least one airway/duct 50 along with a plurality of electrical communication wires connecting the various components of the vibration assembly to the reservoir 19

The vibrator 9 feature could also be activated at the beginning and remain active as long as inhalation pressure is detected by a sensor 27. The vibrator 9 feature could also be activated at the end of the draw. This last embodiment could be useful to those users who are using the vaporization device assembly 10 for taking doses of prescribed medicaments whereby as the user inhales, a pressure change is detected by the pressure sensor 27 and relayed to the vibrator 9 through the microprocessor 11 which at a preprogrammed time after the initially detected change in pressure in the tank, for instance 1-5 seconds, or for instance 3 seconds, the vibrator 9 is activated to alert the user to the end of the dose. In this way, a more accurate dose is delivered and no vaporizable substance is wasted (and battery charge). Moreover, a delay between the beginning of the change in pressure and the end of the dose alert provides time for the vaporization of the substance.

To further illustrate how the vaporization device assembly 10 could be even more useful in dosage precision, the activation of the vibrator could at the same time open the circuit of the battery to the coil thus alleviating the vaporization and ending the dose automatically. In this way, a weaker inhaler, for instance, will remain confident that the dose was administered because the change in pressure indicates that the dose amount of vaporizable substance was vaporized (i.e. removed from the vaporization chamber 22), triggering the change in pressure events. The amount of time between the beginning of the vibration and the change in pressure could be different depending on the prescribed medicinal, due to differences in vaporization time and temperature. Moreover, the amount of time that the vibrator vibrates could also be different depending not only on that, but also on the subjective inhalation strength of the user/patient. For instance, a patient with a strong inhalation may need a shorter vibration time and vice versa for a weaker inhaler.

Once the substance is vaporized, the dose is complete in the event of a medicinal, or the event is over in the event of a recreational user. Even tobacco substances can be used with this device. The tank 17 can be replaceable. It is also contemplated that the tank 17 of the assembly can be disposable. Moreover, in yet another embodiment, the entire assembly is disposable and cannot be reused.

In addition, light-emitting diode ("LED") lights can be provided at the vibration end of the vaporization device assembly 10 whereby the lights are on when the draw is initiated, and off when not, or any other pattern including fading during the duration of the draw. LED lights could also be provided to emphasize the vaporizable substance in the tank 17 in order to easily view the contents therein. The LED lights could be different colors, or change colors during operation of the vaporization device assembly 10. In some embodiments, the light flashes. In another embodiment, the color may go across the length or width or diagonal of the vaporization device assembly 10.

It is also possible that the tactile vibration effect be coupled with other means known in the art to alert a user as to dosage and usage.

The vibrator 9 outputs vibrations to notify the user (e.g., causing the container 10 to move). The vibrator 9 uses, for example, a motor coupled to a plurality of weights, or an eccentric cam system. In some embodiments, a rotational motor causes the plurality of weights to rotate. Each of the plurality of weights may have a different mass, causing the motor and the plurality of weights to rotate unevenly; the uneven rotation leads to vibration. In other embodiments, a linear motor causes the plurality of weights to move.

The vibrator 9 may be, for example, but is not limited to, 6 to 8 millimeters in diameter and/or 3-4 millimeters in length. The vibrator 9 is capable of vibrating a various frequencies depending on the electricity supplied by the battery 1. In some embodiments, the vibrator 9 will rotate/vibrate at 10 Hertz (in other words, 600 rpm) when supplied less than 0.2 Volts from the battery 1. In other embodiments, the vibrator 9 will rotate/vibrate at 100 Hertz (in other words, 6,000 rpm) when supplied more than 1 Volt from the battery 1.

In one embodiment, the microprocessor 11 receives a signal from the pressure sensor 27 based on the air pressure within the reservoir 19 of the tank 17. The signal is indicative of an initiation of an inhalation and/or the end of a draw. The microprocessor 11 determines, at the microprocessor, at least one of an initiation of inhalation and an end of a draw of the vaporization device based on the signal from the pressure sensor. In some embodiments, the microprocessor 11 also receives a second signal related to a duration of time. The duration of time is, for example, but not limited to, how long a user/patient is inhaling/drawing the substance from the vaporization device. Next, the microprocessor 11 activates the vibrator 9 based on the at least one of the initiation of inhalation and the end of a draw of the vaporization device.

The microprocessor 11 activating the vibrator 9 may consist of, for example, electrically connecting the battery 1 to a coil 15 to enable vaporization. The microprocessor 11 may deactivate the vibrator 9 based on the signal from the pressure sensor 27 and/or the duration of time. Deactivating the vibrator 9 consists of, for example, disconnecting the battery 1 from the coil 15 to prevent vaporization.

Figure 7:
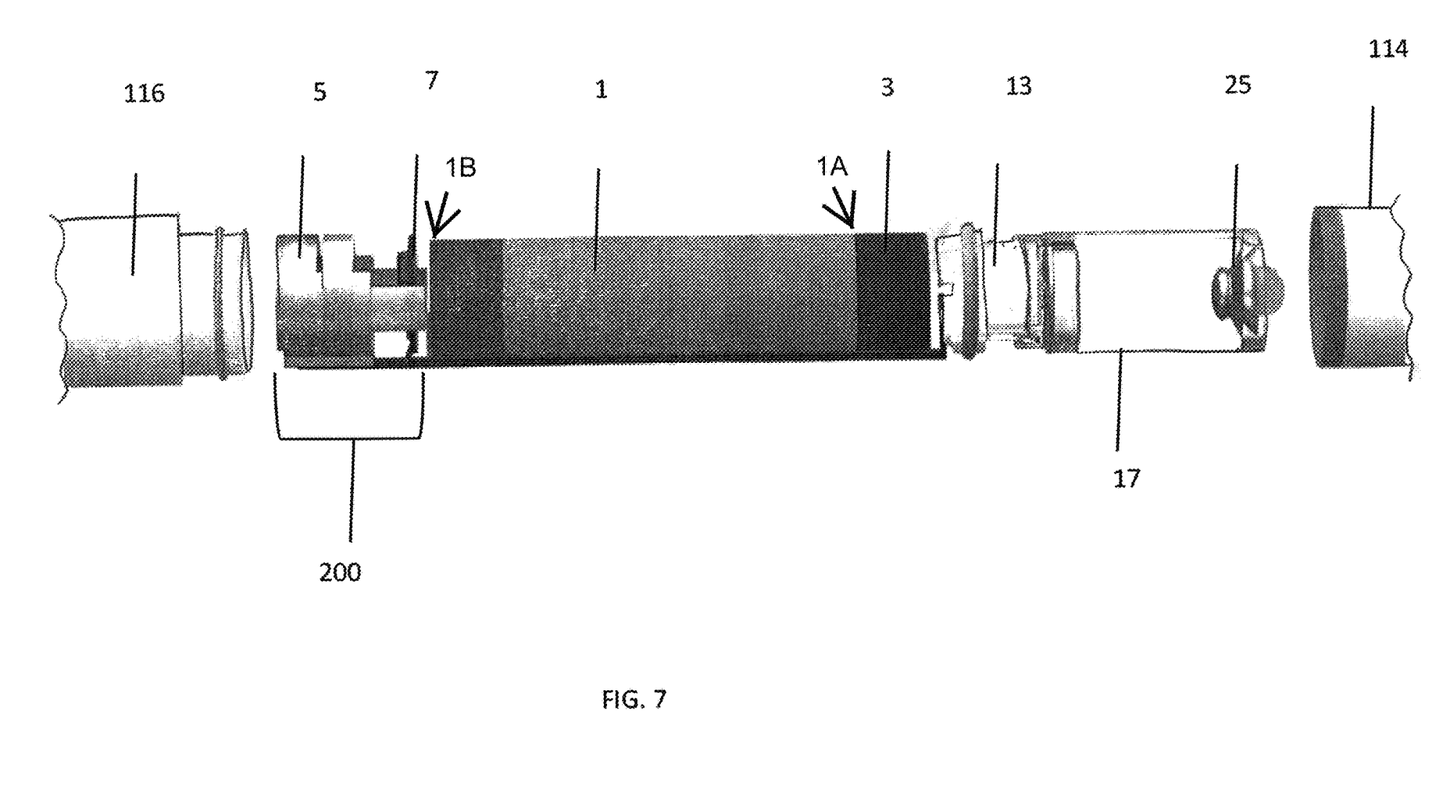
FIG. 7 illustrates the device in assembled form without the cover and with the vibration assembly visible.

FIG. 7 illustrates the vibration assembly 200 for use in a vaporization device, as described herein. The vibration assembly 200 has a vibrator 9, a PCB 7, a microprocessor 11, all embedded in a second spacer 5 which snuggly fits each component for immovable and compact localization within a vaporization device assembly 10.

As to further manners of usage and operation of the present invention, the same should be apparent from the above description. Accordingly, no further discussion relating to the manner of usage and operation will be provided.

While an embodiment of the device, kit, assembly and method of use has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent to one skilled in the art, and all equivalent relationships to those illustrated in the drawings and described in the specification are intended to be encompassed by the present invention.

Throughout this specification, unless the context requires otherwise, the word "comprise" or variations such as "comprises" or "comprising" or the term "includes" or variations, thereof, or the term "having" or variations thereof will be understood to imply the inclusion of a stated element or integer or group of elements or integers but not the exclusion of any other element or integer or group of elements or integers. In this regard, in construing the claim scope, an embodiment where one or more features is added to any of the claims is to be regarded as within the scope of the invention given that the essential features of the invention as claimed are included in such an embodiment.

Those skilled in the art will appreciate that the invention described herein is susceptible to variations and modifications other than those specifically described, and that each embodiment is also provided with features that may be applicable to other embodiments. It is to be understood that the invention includes all such variations and modifications that fall within its spirit and scope. The invention also includes all of the steps, features, compositions and compounds referred to or indicated in this specification, individually or collectively, and any and all combinations of any two or more of said steps or features.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vaporization device assembly, comprising:
a mouthpiece;
a battery having a first end and a second end opposite the first end;
a first dampening spacer, comprising silicone and disposed at the first end of the battery;
a second dampening spacer, comprising silicone and disposed at the second end of the battery;
a printed circuit board, a vibrator and a microprocessor housed in the second dampening spacer;
a coil holder configured to accommodate a coil, a vaporization chamber, and a wick having a plurality of wick portions, the coil configured to vaporize a vaporizable substance accommodated by the coil holder;
a tank having a reservoir, a first end and a second end, the reservoir configured for housing a vaporizable substance, the wick portions being in fluid communication with the reservoir;
a reservoir plug partially received by the first end of the tank; and
a pressure sensor in pneumatic communication with the reservoir of the tank via the second end of the tank, the pressure sensor configured to detect an inhalation event,
wherein the battery is configured to supply electrical power to the printed circuit board, the vibrator, the microprocessor, and the coil,
wherein the first end of the battery is electrically connected to the coil,
wherein the second end of the battery is electrically connected to the printed circuit board,
wherein the microprocessor is programmed to activate the vibrator based on the inhalation event, and
wherein the battery is contiguous with the first dampening spacer, and the first dampening spacer separates the battery from the tank and the mouthpiece.

2. The vaporization device assembly of claim 1, wherein the microprocessor is programmed to activate the vibrator at least one of: at an initiation of an inhalation, at the initiation of the inhalation and through an end of a draw, or at the end of the draw.

3. The vaporization device assembly of claim 2, wherein the microprocessor is programmed to activate the vibrator at the end of the draw, and to disconnect the battery from the coil to prevent further vaporization of the vaporizable substance.

4. The vaporization device assembly of claim 3, wherein the microprocessor is programmed to activate the vibrator based on at least one of: a preprogrammed pressure, or a time elapsed after initiation of inhalation.

5. A kit, comprising:
a vaporization device assembly including:
a battery having a first end and a second end opposite the first end;
a first dampening spacer comprising silicone and disposed at the first end of the battery;
a second dampening spacer comprising silicone and disposed at the second end of the battery;
a printed circuit board, a vibrator and a microprocessor housed in the second dampening spacer;
a coil holder configured to accommodate a coil, a vaporization chamber, and a wick having a plurality of wick portions, the coil configured to vaporize a vaporizable substance accommodated by the coil holder, the wick portions configured to be in fluid communication with a reservoir of a tank when the tank is received within the vaporization device assembly;
a mouthpiece; and
a pressure sensor configured to detect an inhalation event when the tank is received within the vaporization device assembly and during operation of the vaporization device assembly,
the battery configured to supply electrical power to the printed circuit board, the vibrator, the microprocessor, and the coil,
the second end of the battery being electrically connected to the printed circuit board,
the first end of the battery being electrically connected to the coil,
the microprocessor programmed to activate the vibrator based on the inhalation event, and
the battery being contiguous with the first dampening spacer, the first dampening spacer separating the battery from the mouthpiece; and
a charging case comprising a lid, a cradle and a base for charging the vaporization device; and
the tank, filled with a vaporizable substance and configured to be received within the vaporization device assembly, the tank having a reservoir plug partially received at an end thereof.

6. A method for controlling vibration within a vaporization device, the vaporization device including a first dampening spacer and a second dampening spacer, each of the first dampening spacer and the second dampening spacer comprising silicone, the method comprising:
receiving, at a microprocessor, a signal from a pressure sensor in pneumatic communication with a reservoir of the vaporization device;
determining, at the microprocessor, at least one of an initiation of inhalation or a termination of a draw of the vaporization device based on the signal from the pressure sensor; and
activating a vibrator based on the at least one of the initiation of inhalation or the termination of a draw of the vaporization device.

7. The method of claim 6, wherein activating the vibrator includes electrically connecting a battery to a coil to enable vaporization.

8. The method of claim 6, further comprising deactivating the vibrator based on the at least one of the initiation of inhalation and the termination of a draw of the vaporization device.

9. The method of claim 8, wherein deactivating the vibrator includes disconnecting a battery from a coil to prevent vaporization.

10. The method of claim 6, wherein the signal from the pressure sensor is a first signal, the method further comprising receiving, at the microprocessor, a second signal related to a duration of time.

11. The method of claim 10, further comprising determining, at the microprocessor, the at least one of the initiation of inhalation or the termination of the draw of the vaporization device based on the first signal and the second signal.

12. The vaporization device assembly of claim 1, wherein the inhalation event includes at least one of: a beginning of an inhalation by a user, an end of an inhalation by a user, a beginning of a vaporization event, or an end of a vaporization event.

13. The vaporization device assembly of claim 1, wherein a portion of the reservoir plug has a conical shape.

14. The vaporization device assembly of claim 13, wherein the reservoir plug includes a locking ball.

15. The vaporization device assembly of claim 1, wherein the second dampening spacer is configured to specifically accommodate a shape of at least one of the pressure sensor, the printed circuit board, the microprocessor, or the vibrator.

16. The vaporization device assembly of claim 1, configured such that, during operation:
the vibrator generates a vibration; and
a strength of the vibration at the mouthpiece is dampened by the second dampening spacer.

* * * * *